Nov. 18, 1941. P. H. WILLIAMS 2,263,479
ACCOUNTING MACHINE
Filed Aug. 24, 1936. 6 Sheets-Sheet 1

Inventor
Paul H. Williams
By
Carl Beust
His Attorney

Nov. 18, 1941.    P. H. WILLIAMS    2,263,479
ACCOUNTING MACHINE
Filed Aug. 24, 1936    6 Sheets-Sheet 2

Inventor
Paul H. Williams
By
Earl Beust
His Attorney

Patented Nov. 18, 1941

2,263,479

UNITED STATES PATENT OFFICE 2,263,479

ACCOUNTING MACHINE

Paul H. Williams, Dayton, Ohio, assignor to The National Cash Register Company, Dayton, Ohio, a corporation of Maryland Application August 24, 1936, Serial No. 97,547

22 Claims. (Cl. 235—60)

This invention relates to bookkeeping or accounting machines and the like, and is particularly directed to machines of the type illustrated and described in Letters Patent of the United States, No. 1,197,278 and No. 1,203,863, issued respectively September 5, 1916, and November 7, 1916, to Halcolm Ellis, and Patent No. 1,819,084, issued August 18, 1931, to Emil John Ens.

This invention is shown embodied in the well known Ellis type of accounting machine illustrated and described in the above patents, and in its present arrangement is known as a "bank service machine" and is used for balancing individual checking accounts. However, it is not the desire to restrict the use of this invention to the Ellis type of machine, as it may easily be applied to various other machines. Neither is it the desire to limit this invention to bank service machines or to any particular business system, as the flexibility of said machine and the numerous features thereof admirably adapt it for the handling of practically any accounting problem in connection with various business systems.

In balancing individual checking accounts it is the general practice to print debit items, such as checks drawn against the account, in a distinctive color, for example, red. However, in some business systems it is the practice to print debit items in black, and when so printed, an identifying character or symbol is generally printed in conjunction therewith. As formerly constructed, the machine embodying this invention was arranged to print debit items in red, and it is therefore broadly an object of this invention to provide mechanism that permits debit items to be printed either in red or in black.

Another object of this invention is the provision of a key controlled mechanism to cause debit or subtractive items to be printed in black.

Still another object is to supply means to disable the mechanism that normally shifts the inking ribbon to red printing position in debit or subtracting operations.

A further object of this invention is to provide means to cause an identifying character or symbol to be printed opposite debit items when said items are printed in black.

A still further object is the provision of means that compels the performance of two conditions before the subtract symbol will print, namely, the depression of the key that causes debit items to be printed in black, and the conditioning of the machine for a subtract operation.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Figs. 3 and 4 are facsimiles of fragments of similar ledger sheets. Fig. 3 shows the subtract items or checks printed in black and Fig. 4 shows the subtract items or checks printed in red.

GENERAL DESCRIPTION

The machine embodying the instant invention is provided with a traveling carriage similar to that used on typewriters, which is automatically tabulated from right to left during machine operations, and which may be returned automatically from tabulated positions to starting position, or to certain predetermined positions. This machine has a plurality of rows of denominational amount keys which, when depressed, control the positioning of their respective actuators commensurate with the value of the depressed keys, and said actuators in turn position their respective printing sectors in accordance with the depressed amount keys and enter the amount in the selected totalizer or totalizers.

The present machine has a balance totalizer, in which positive or negative amounts may be entered, and one or more adding totalizers arranged in vertically alined pairs at the rear of the machine. The different totalizers are selected for addition and the balance totalizer is selected for subtraction by means of hanging bar levers in cooperation with control elements, mounted upon the traveling carriage, in columnar positions thereof. The other functions of the machine are controlled by means of a row of control keys located on the extreme left of the keyboard, said control keys including a "subtract" key that selects the balance totalizer for subtract operations, a "balance" key that clears the #1 or balance totalizer, a "sub-balance" key that selects the balance totalizer for a sub-total operation, and a "release" key that releases the depressed amount keys and control keys.

The occurrence of an overdraft in the balance totalizer is made manifest to the operator by the locking of the balance and sub-balance keys and the simultaneous unlocking of an "overdraft" key located in the upper right-hand corner of the keyboard. Depressing the overdraft key causes the complementary amount of an overdraft to be transposed to a true negative balance, and this true negative balance printed in a distinctive color. The machine of the present invention has an auxiliary keyboard, located in front of the regular keyboard, which supports a plurality of date keys, a plurality of symbol keys and, on the extreme left side, a "black" key.

Ordinarily subtractive items are printed in red, however, depressing the black key disables the mechanism that causes the ribbon to be moved to red printing position, during subtract operations, which in turn permits the black portion of the bichrome ribbon to be moved to printing position. Depressing the black key also causes an identifying symbol to be printed opposite the amount, when one or more of the amount keys is depressed, and when the traveling carriage is tabulated to a subtract column. Ordinarily the black key is automatically released at the end of each machine operation, however, means is provided for locking the black key in depressed position, if desired.

The black key mechanism and other mechanism of the machine pertinent thereto, will now be described in detail.

DETAILED DESCRIPTION

Machine framework

The mechanism of the machine embodying the instant invention is supported by a right frame 30 and a left frame 31 (Figs. 6 and 14) said frames being secured to a machine base 32 and connected by cross frames 33 and 34 and various other cross frames and rods (not shown). The mechanism of the machine is enclosed in a case 35 having ways secured to the top thereof which support a traveling carriage 36 for lateral shifting movement. The traveling carriage 36 rotatably supports a platen roll 37 which supports the record material and presents it to the inking ribbon and type carriers.

The mechanism of the machine is operated by a main drive shaft 38 (Figs. 6 and 10), journaled in the frames 30 and 31, which shaft 38 has secured thereon an arm 25 (Fig. 7) connected by a link 26 to the driven member of a clutch (not shown). The driving member of the clutch is connected to any convenient power source, preferably an electric motor, similar to that illustrated and described in Letters Patent of the United States No. 1,601,102, issued September 28, 1926, to F. W. Bernau.

Keyboard

Figure 1:
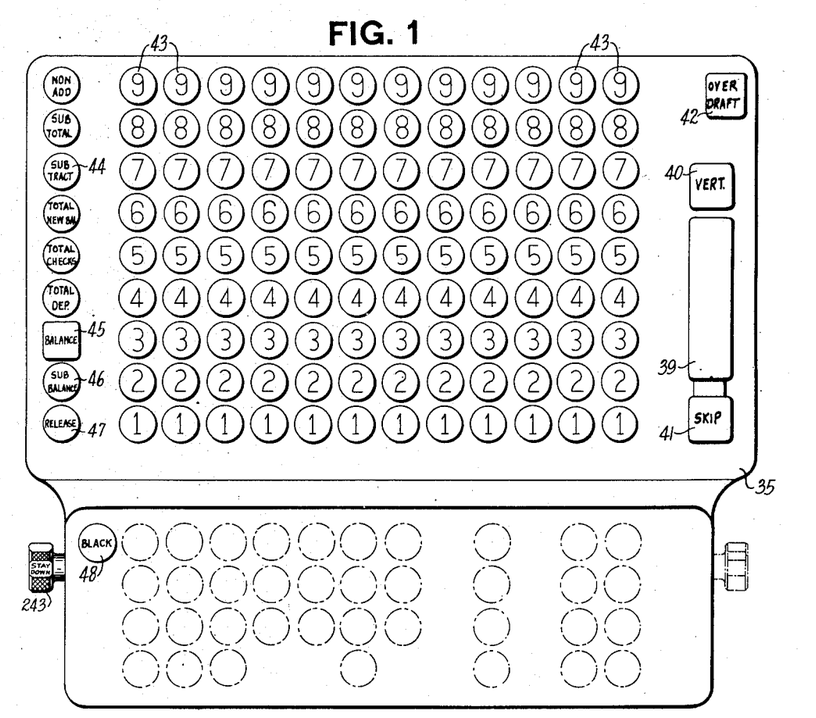
Fig. 1 is a diagrammatic plan view of the keyboard of the machine embodying the instant invention.

Referring to Fig. 1, the keyboard of the present machine comprises the usual starting bar 39, a "vertical" feed starting bar 40, a "skip-tabulating" starting bar 41, an "overdraft" key 42, a plurality of rows of denominational amount keys 43, a "subtract" key 44, a "balance" key 45, a "sub-balance" key 46, and a "release" key 47. Immediately in front of the main keyboard is an auxiliary keyboard which comprises date keys, symbol keys, and a key 48, which will hereinafter be referred to as the "black" key. Depressing the black key 48 causes subtractive items, which are usually printed in red, to be printed in black, in a manner later to be described.

Depressing any one of the starting bars 39, 40, or 41 closes the motor switch and engages the clutch mechanism which, through the link 26 and the arm 25, drives the shaft 38 through an approximate angle of 60 degrees to operate the machine through one cycle of movement. At the end of the machine operation the motor switch is opened, the clutch is disengaged, and the starting bar is restored to undepressed position. In addition to setting the machine in motion, depressing the vertical feed starting bar 40 causes the platen 37 (Fig. 6) to be rotated to line-space the record material carried by the platen. Depressing the skip-tabulating bar 41, in addition to causing the machine to cycle, also causes the traveling carriage 36 to skip-tabulate to predetermined columnar positions. The mechanism operated by the starting bars forms no part of the invention and will not be described further herein. For further details see the United States patent to Raymond A. Christian, No. 2,082,098, which was filed June 25, 1934, and issued June 1, 1937.

When an overdraft occurs in the balance totalizer, an interlock between the balance key 45 and the overdraft key 42 locks said balance key against depression and unlocks the overdraft key, depression of which initiates a three-cycle overdraft operation, in which the complement of the overdraft is transposed to a true negative amount and this amount is printed upon the record material carried by the platen roll, and is simultaneously added in one or more of the totalizers. The balance key 45 and the sub-balance key 46 are likewise motorized, and when depressed set the machine in motion and select the #1 or balance totalizer for total-taking or sub-total-taking operation respectively. The release key 47 provides a manual means of releasing the depressed amount keys 43, certain of the control keys in the column at the extreme left of the keyboard, and the black key 48. The mechanism operable in an overdraft operation is shown more fully in the United States patent to Charles L. Lee, No. 2,079,355, which was filed April 14, 1932, and issued on May 4, 1937.

Figures 6, 7:
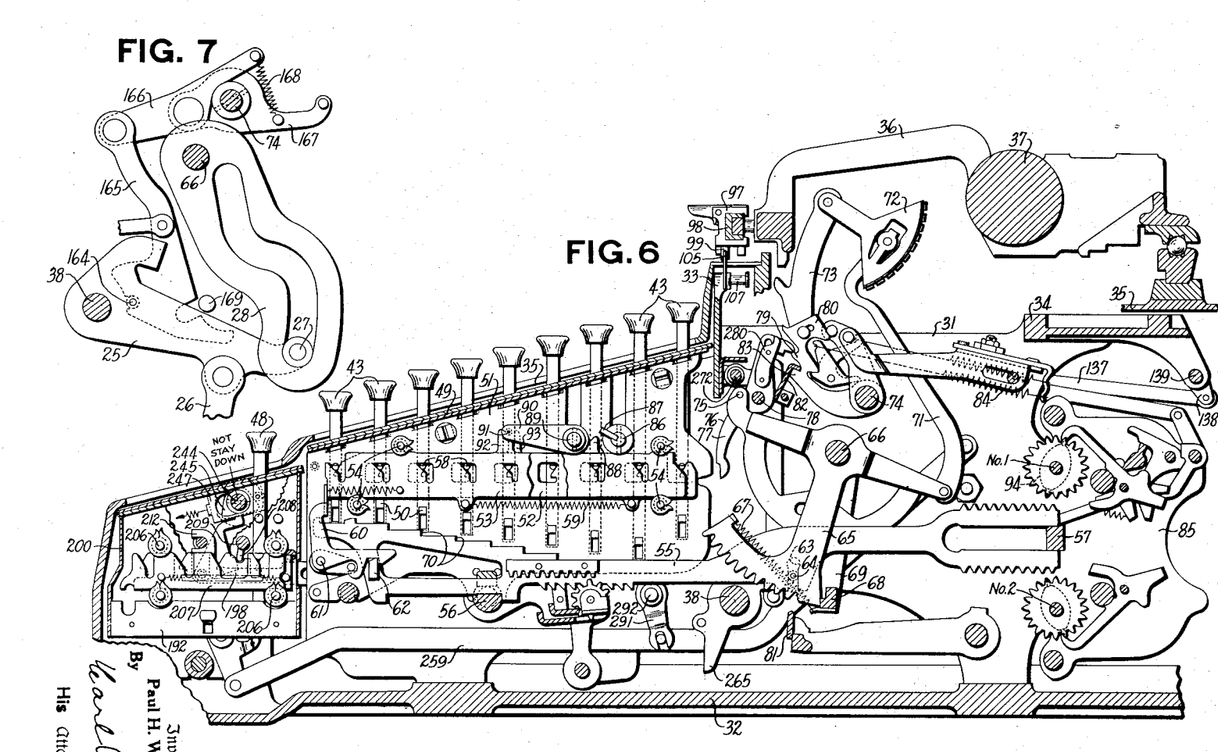
Fig. 6 is a cross-sectional view of the machine proper, taken just to the right of the lowest order amount bank and shows in particular the actuator for said amount bank, the manner in which said actuator positions the type carriers for said amount bank, and how said actuator actuates two of the totalizers.
Fig. 7 is a detail of a part of the machine operating mechanism.

Referring to Fig. 6, which is a cross-sectional view taken just to the right of the lowest order or units of cents amount bank, the upper ends of the amount keys 43 (Fig. 6) extend through openings in a keyboard plate 49 secured to the frames 30 and 31. Each of said amount keys carries a square stud 50 which extends through a corresponding slot in a partition plate 51 supported by the keyboard plate 49. Associated with each amount bank is a detent plate 52 and a control plate 53, mounted to slide horizontally on the plate 51 by means of four rollers on studs 54 secured in said plate. Also associated with each amount bank is an actuator rack 55 mounted for horizontal reciprocating movement by means of a rod 56 and a bar 57 extending between the frames 30 and 31.

Depressing an amount key causes a pin 58 therein, in cooperation with its corresponding hook-shaped projection formed in apertures in the plate 52, to shift said plate rearwardly or toward the right, as here viewed, against the tension of a spring 59, opposite ends of which are connected to the plates 52 and 53. When the pin 58 passes beyond the hook-shaped projection, the spring 59 returns the plate 52 forwardly to cause the hook to move into the path of the flat-topped surface of said pin 58, to obstruct upward movement of the key 43 under influence of a coiled spring (not shown) and to thereby lock said key in depressed position. Likewise depressing an amount key causes the pin 58 therein, in cooperation with its corresponding angular opening in the plate 53, to shift said plate forwardly against the action of the spring 59 to rock a zero latch 60 counter-clockwise on its pivot 61 to disengage the hook of said latch from a lug 62 on the actuator 55.

Each of the actuators 55 has a vertical slot 63, which engages a stud 64 secured in an arm of a corresponding reducer segment 65 loose on the shaft 66. The reducer segment 65 is connected by a spring 67 to a bail of a leading frame 68, said bail extending between two similar arms 69, only one here shown, secured on the shaft 66. The main operating shaft 38 is operatively connected to the shaft 66 by a roller 27 on the arm 25 in cooperation with a slot in a plate 28 secured on the shaft 66 (Fig. 7), and oscillating movement of said shaft 38 rocks the shaft 66 and the leading frame 68 first counter-clockwise and then back to normal position. The spring 67 normally maintains an extension of the segment 65 in contact with the bail 68 of the leading frame. However, when no amount key is depressed, the zero latch 60 retains the actuator 55 in zero position and oscillating movement of the leading frame 68 flexes the spring 67 without imparting any movement to the segment 65.

Depressing an amount key rocks the zero latch 60 to ineffective position and moves the stud 50 on said amount key into the path of the corresponding one of a series of steps 70 cut in the top surface of the actuators. Upon operation of the machine, initial movement counter-clockwise of the leading frame 68 by means of the spring 67 carries the segment 65 and the actuator 55 in unison therewith until the corresponding step 70 engages the stud 50 of the depressed amount key. This differentially positions the actuator 55 and the segment 65 commensurate with the value of the depressed amount key, and the spring 67 permits the leading frame 68 to complete its counter-clockwise movement independently of said segment 65 and said actuator 55. A link 71 (Fig. 6) connects an arm of the segment 65 to a type sector 72, for that particular amount bank, and consequently transmits the differential positioning of said segment 65 to said type sector 72. The sector 72 is pivotally connected to an arm 73 rotatable on a shaft 74, journaled in the end plates that support the printer mechanism.

When the segment 65 moves out of zero position, a stud 75 in an extension thereof, in cooperation with an arcuate surface 76 on the tail of a zero elimination pawl or order hook 77, rocks said order hook counter-clockwise, on its pivot 78, to move a tooth in the upper end thereof out of engagement with a corresponding tooth 79 on a plate 80 connected to the arm 73 and loose on the shaft 74. After the leading frame 68 has completed its initial movement counter-clockwise, an aliner 81 is rocked into engagement with a corresponding tooth space in the segment 65 to aline said segment, the actuator 55, and the printing sector 72 in set positions. After the differential mechanism has been thus alined, a printer release trigger 82 is rocked counter-clockwise out of engagement with a projection 83 of the plate 80, to release said plate, the arm 73 and the sector 72 to the action of a spring 84, which urges said parts clockwise to cause the sector 72, in cooperation with the inking ribbon, to imprint the value of the depressed amount key upon the record material. In adding operations, while the actuators 55 are thus differentially positioned, the wheels of the selected totalizer or totalizers are engaged with teeth in the right-hand end of said actuators, as viewed in Fig. 6. Return movement clockwise of the leading frame 68 returns the rack 55, the segment 65, and the type sector 72 to zero position, and this return movement of the rack 55 rotates the wheels of the selected totalizer to enter the amount set up on the keyboard therein.

The machine embodying the present invention has two totalizer lines, a #1 or balance totalizer line, and a #2 or adding totalizer line, mounted in a totalizer framework 85 secured to the rear of the frames 30 and 31. It is simply a matter of assembly to increase the capacity of the machine by adding additional pairs of totalizer lines in back of the #1 and #2 totalizers. The #1 or balance totalizer has a dual transfer mechanism for transferring amounts from lower to higher denominations, and this transfer mechanism is automatically shifted from adding to subtracting position when the #1 totalizer is selected for a subtract operation. The #2 totalizer has a single transfer mechanism for transferring amounts from lower to higher denominations. Further description of the transfer mechanisms is believed unnecessary, as this type of transfer mechanism is well known in the art and has been in continuous use on machines of this type for some time.

In subtract operations the wheels of the #1 or balance totalizer are moved into engagement with the racks 55 prior to their initial movement rearwardly, which movement reversely rotates said wheels to subtract the amount, set up on the keyboard, therefrom.

At the beginning of machine operation, a shaft 86 (Fig. 6) journaled in the partition plates 51 is rocked counter-clockwise by mechanism shown in Fig. 15 and later to be described, to move a bar 87 carried thereby in the path of a lug 88 on the locking detent 52. This causes the proper hook on said detent, in cooperation with the pin 58 of the depressed amount key, to lock said amount key depressed and causes the remaining hooks on said detent 52 in cooperation with the pins 58 on the undepressed amount keys to lock said keys against depression during machine operation.

Near the end of adding and subtracting operations, after the bar 87 has been returned clockwise out of the path of the lug 88, a shaft 89, opposite ends of which are journaled in the plates 51 of the keyboard assembly, is rocked first counter-clockwise and then back to normal position by mechanism later to be described. Secured on the shaft 89 is an arm 90, for each amount bank, carrying a stud 91, which cooperates with angular surfaces of projections 92 and 93 of the plate 53 and the detent 52 respectively. Counter-clockwise movement of the arm 90 and the stud 91 shifts the plate 53 forwardly for a purpose presently to be described, and shifts the detent 52 rearwardly to disengage the hook on said plate from the pin 58 of the depressed amount key, to permit said key to be spring returned upwardly to undepressed position.

At the beginning of a sub-total or a total operation, the shaft 89 (Fig. 6) and the arm 90 are rocked counter-clockwise, in a manner later to be described, to shift the plate 53 forwardly to rock the zero latch 60 counter-clockwise to disengage said latch from the lug 62 prior to initial movement of the leading frame 68. Simultaneously the detent 52 is shifted rearwardly to release any amount key that may have been inadvertently or accidentally depressed. Also prior to initial movement of the leading frame 68 the selected totalizer is engaged with the actuator 55, after which initial movement of the leading frame 68 and said actuator 55 reversely rotate the corresponding wheel of said totalizer until one of two diametrically opposed teeth on a tripping plate 94, integral with the totalizer wheel of this particular denomination, comes in contact with the tooth of the add-transfer pawl. This locates the totalizer wheel in zero position and positions the rack 55, the segment 65, and the printing sector 72, in accordance with the amount on said totalizer wheel. Immediately thereafter the printing mechanism functions to print the amount taken from the totalizer wheel upon the record material.

In total or resetting operations, the totalizer wheel is disengaged from the rack 55 prior to its return movement forwardly, thus leaving said wheel in zero position, and in sub-total or reading operations, the totalizer wheel remains in engagement with the rack 55 during its return movement forwardly, and is consequently returned to its original position. Inasmuch as all the amount banks of the present machine are similar in construction and operation, it is believed that the description given above of the lowest order amount bank is sufficient for the present purpose.

Subtract operations

Figure 3:
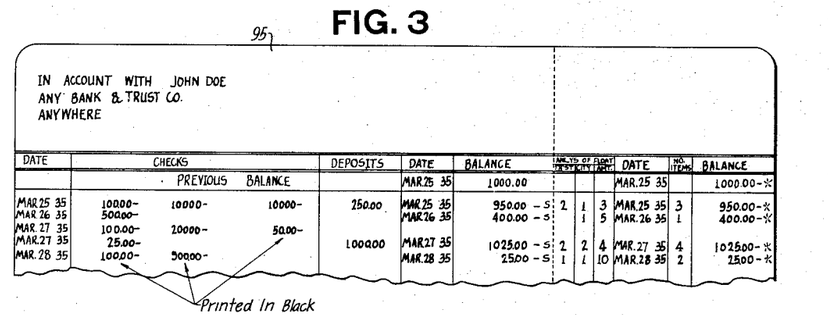
Figure 4:
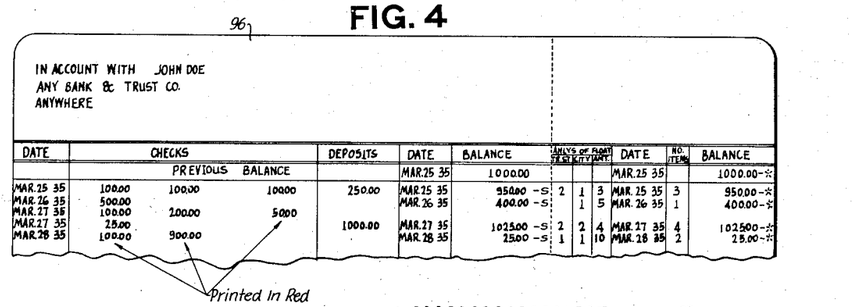

The ledger sheets 95 and 96, pictured respectively in Figs. 3 and 4, are divided into a plurality of vertical columns, including date, check, deposit, and balance columns. These ledger sheets are typical of those used by banks in balancing individual checking accounts, and each has a detachable stub portion which is detached from the main portion at the end of a certain period and retained by the bank, while the main portion is given to the depositor. It will be noted that the check column is wide enough for three checks to be printed in a line, and if there are more than three checks to be listed at one time, after the third entry the traveling carriage is returned to the first check division and simultaneously line-spaced. After this, three more checks may be entered in a line and this procedure repeated as many times as necessary.

The only material difference between the ledger sheets 95 and 96 is that the check items are printed in black on the ledger sheet 95 and in red on the sheet 96. Control elements 97 (Figs. 5 and 6) adjustably mounted upon a bar 98 secured to the traveling carriage, are positioned on said bar corresponding to the three divisions of the check column, and position the ledger sheet in relation to the printing mechanism, and select and condition the balance totalizer for a subtract operation.

Figure 5:
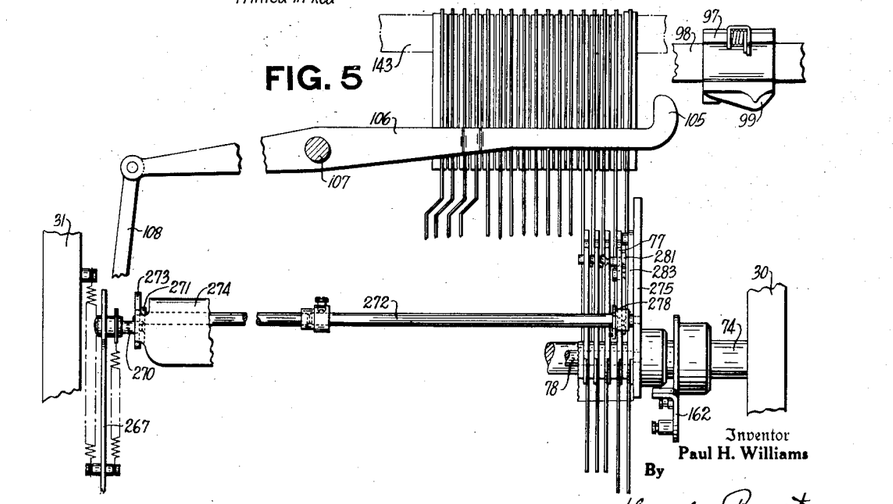
Fig. 5 is a front elevation showing the subtract hanging bar lever and one of the control elements on the carriage associated therewith, the printing sectors and the mechanism that causes the subtract symbol printing sector to function when subtractive items are printed in black.

When one of the divisions of the check column is opposite the printing mechanism, a lug 99 on the element 97 engages an upward extension 105 of a hanging bar lever 106 and rocks said hanging bar lever clockwise as viewed in Fig. 5, on its pivot 107, which pivot is secured in the cross frame 33. Clockwise movement of the lever 106 by means of a yieldable linkage 108 (see also Figs. 10 and 14) which connects said lever to an arm 109 of a lever 110 pivoted at 111 to the frame 31, rocks said lever 110 counter-clockwise, causing a projection 112 thereon, in cooperation with a stud 113 in a lever 114, to rock said lever 114 also counter-clockwise on its pivot 115 fast in the frame 31.

Also loose on the pivot 115 (Figs. 2 and 10) is an arm 116 with a bent-over ear 117 urged counter-clockwise into engagement with the edge of the subtract key 44 by a spring 119. When the subtract key 44 is depressed, a notch 118 therein moves opposite the ear 117, permitting the arm 116 to be rocked counter-clockwise by the spring 119. A projection of the arm 116, in cooperation with a stud 120 in the lever 114, rocks said lever counter-clockwise in unison therewith against the tension of a spring 121.

Counter-clockwise movement of the lever 114, either under influence of the control element 97 on the carriage or the subtract key 44, causes a stud 122, in the hook shaped lower end thereof, in cooperation with a camming surface on an engaging lever 123 pivoted on a stud 124 in the left frame 31 (Fig. 2) to rock said lever 123 counter-clockwise to move engaging pawls 125 and 126 carried thereby into cooperative relationship with the lower end of a flying lever 127 pivotally mounted on a totalizer engaging plate 128 secured on the main shaft 38. A link 129 connects the flying lever 127 to an arm 130 secured on a No. 1 totalizer engaging shaft 131 journaled in the totalizer framework 85 (Fig. 6). A link 132 connects the lever 114 to a bell crank 133 rotatable on a stud 134 in the frame 31. Consequently counter-clockwise movement of said lever 114 rocks the bell crank 133 in a clockwise direction. One end of a link 135 is pivoted to the bell crank 133 while the upper end of said link is slotted to embrace a stud 136 in a link 137, one end of which is pivoted to a crank 138 secured on a color shifting shaft 139 journaled in downward extensions of the cross frame 34 (Fig. 6). Due to a spring 140, which flexibly connects the links 135 and 137, downward movement of the link 135 moves a hook shaped forward end 141 of the link 137 into the path of a square stud 142 secured in the link 129.

In subtract operations, initial movement counter-clockwise of the shaft 38 and the plate 128 (Fig. 2) causes the lower end of the flying lever 127 to engage the pawl 125 to shift the link 129 forwardly, and rock the arm 130 and the shaft 11 clockwise to engage the #1 or balance totalizer with the actuators 55 (Fig. 6) prior to their initial movement rearwardly. Forward movement of the link 129 causes the stud 142 to engage the hook 141 to shift the link 137 forwardly to rock the color shifting shaft 139 clockwise to cause the red portion of the bichrome ribbon to be lifted into printing position in a manner presently to be described. The shaft 139 is returned counter-clockwise to normal or black printing position at the end of each machine operation in a manner to be described later.

*Ribbon mechanism*

A bichrome inking ribbon 143 (Figs. 8, 9, and 14) is wound around two reversible spools (not shown) mounted upon the machine case 35 and positioned so as to feed the ribbon 143 between the type sectors and the platen roll. The ribbon 143 is threaded between upwardly extending prongs of a ribbon shifting fork 144, said prongs being adapted to straddle the printing sectors. The fork 144 has bent-over ears which embrace respectively uprights 145 secured to a top plate 146 of the printer assembly. A downward extension of the fork 144 has symmetrical right angled ears 147 slotted to embrace opposed tenons of a stud 148 secured in the forward end of a lever 149 pivoted at 155 to the cross frame 34. The rearward end of the lever 149 is connected by a link 156 to an arm 157 of a yoke 158 pivoted on trunnions 159 in extensions of the frame 34. Another arm of the yoke 158 carries a stud 160 which extends through a slot in one end of a link 161, the other end of which is pivotally connected to a lever 162, secured on the printer shaft 74. A spring 163 tensioned between the stud 160 and the link 161 urges the yoke 158 clockwise to normally maintain the stud 160 in contact with the forward end of the slot in the link 161. Referring to Fig. 7, a stud 164 in the arm 25 normally engages a notch in a link 165, the upper end of which is pivoted to an arm 166 fulcrumed on an extension of an arm 167 secured on the shaft 74. A spring 168 tensioned between the arms 166 and 167 forms a flexible connection and normally maintains an extension of the arm 166 in contact with a hub of the arm 167.

In adding, subtracting, and total-taking operations, consisting of one cycle of movement of the shaft 38, the arm 25, through the link 165, drives the arms 166 and 167 and shaft 74 first clockwise and then back to normal position. Initial movement clockwise of the shaft 74 and the arm 162 (Figs. 8 and 9) moves the link 161 forwardly which by means of the yoke 158 and the link 156 rocks the lever 149 clockwise to lift the fork 144 to move the ribbon 143 into printing position. Return movement counter-clockwise of the shaft 74 and connected parts returns the fork 144 downwardly to move the inking ribbon to a position where it will not obstruct the view of the printing on the record material carried by the platen roll 37.

In overdraft operations, the shaft 38 (Fig. 7) and the arm 25 receive three cycles of movement. However, prior to movement of these parts the link 165 is shifted counter-clockwise to disengage the notch therein from the stud 164 and to engage another notch in said link with a stationary stud 169. The printer shaft 74 remains thus uncoupled from its drive arm 25 until the final or third cycle of an overdraft operation, near the beginning of which the link 165 is reengaged with the stud 164 prior to initial movement of the arm 26. It is therefore obvious that in overdraft operations the printing mechanism receives one working stroke, the same as in other operations.

A stud 170 in the arm 157 of the yoke 158 (Figs. 8, 9, 14, 16, 19, and 20) cooperates with a hook 171 pivoted to a bracket 172 adjustably attached to an extension of the cross-frame 34. The bracket 172 and the hook 171 are adjustable in relation to the stud 170 by means of a slot in said bracket which straddles an eccentric 173 secured in the extension of the frame 34. The eccentric 173 also forms a bearing for the shaft 139. A spring 174 urges the hook 171 clockwise to normally maintain an extension 175 thereof in contact with a stud 176 in a crank 177 secured to the shaft 139.

Figures 8, 9, 10, 11, 12, 13:
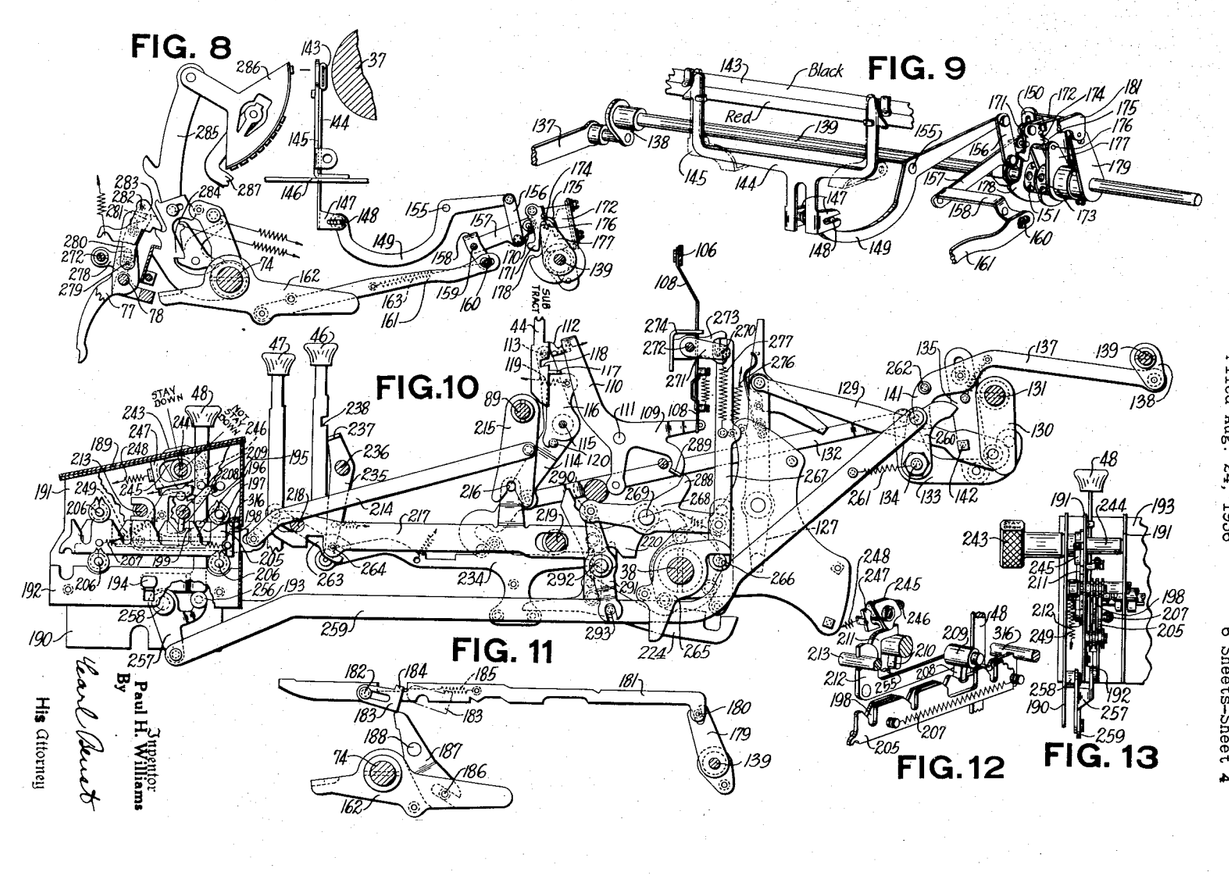
Fig. 8 is a side elevation, as observed from the right, of the mechanism that lifts the inking ribbon to printing position each machine operation, the symbol printing sector and the mechanism that controls the printing movement of said sector when subtractive items are printed in black.
Fig. 9 is a perspective view of the ribbon shifting or vibrating mechanism.
Fig. 10 is a side elevation, as observed from the right of the machine, showing the mechanism that controls the ribbon shifting and the symbol printing in subtract operations.
Fig. 11 is a detail view of the mechanism that returns the ribbon shifting mechanism to black printing position near the end of each machine operation.
Fig. 12 is a perspective view of the control plates for the key that causes subtractive items to be printed in black.
Fig. 13 is a front view of the black key and a part of its associated mechanism.

When the shaft 139 is in its counterclockwise position as shown in Fig. 6, the crank 177 positions the hook 171 so that it is in the path of the stud 170, and consequently said hook 171 obstructs full movement clockwise of the yoke 158 to cause the ribbon fork 144 to be lifted to a position where the upper or black edge of the ribbon 143 is interposed between the type sectors and the platen 37. When the mechanism shown in Fig. 2, under influence of one of the subtract control elements 97 on the traveling carriage 36 or the subtract key 44, shifts the color shaft 139 clockwise in a manner explained earlier herein, the stud 176 in the crank 177, in cooperation with the extension 175 of the hook 171, shifts said hook counterclockwise out of the path of the stud 170 (Fig. 8). Initial movement of the arm 162 and the link 161 rocks the yoke 158 clockwise until the stud 170 engages an extension 178 of a bracket 150 secured to the frame 34 by the screws that also secure the bracket 172. The extension 178 is adjustable in relation to the stud 170 by means of an eccentric 151 (Fig. 16), loose on the eccentric 173, in cooperation with a slot in said bracket 150. When the stud 170 is moved into engagement with the extension 178, the lever 149 will have lifted the fork 144 an additional distance to position the lower or red portion of the ribbon 143 between the printing sectors and the platen 37. The slot in the link 161, in cooperation with the stud 160 and the spring 163, permits the said link 161 to move independently of the yoke 158 when the hook 171 obstructs the clockwise movement of said yoke.

The color shaft 139 is restored to black printing position near the end of each machine operation by the mechanism shown in Fig. 11. Secured on the shaft 139 is a crank 179 the upper end of which is bifurcated to straddle a stud 180 in one end of a pitman 181, mounted to slide laterally in grooves in the frame 34 and the printer frame. The pitman 181 carries a stud 182 which extends through a slot in a by-pass pawl 183 having a bent-over ear 184 which is normally maintained in contact with the bottom of a groove in the top edge of the pitman 181 by a spring 185 tensioned between said by-pass pawl and said pitman.

When the shaft 139 is rocked clockwise to red printing position the pitman 181 and the by-pass pawl 183 move in unison therewith until said pawl is in the position indicated by dot and dash lines in Fig. 11. Initial movement clockwise of the shaft 74 and the arm 162 causes a stud 186 in said arm, in cooperation with the bifurcated lower end of a lever 187, pivoted on a stud 188 secured in the printer frame, to rock said lever 187 also clockwise to cause the upper end thereof to by-pass the pawl 183. Return movement counterclockwise of the shaft 74 and the arm 162, after printing has been effected, causes the lever 187 in cooperation with the pawl 183 and the pitman 181 to return the shaft 139 counterclockwise to normal or black printing position. After the pitman 181 is fully restored forwardly, the by-pass pawl 183, due to the slot therein and the spring 185, moves on independently of said pitman a slight distance in unison with the lever 187 until the angle of the slot, in said by-pass pawl 183, causes the tooth thereof to ride off the top of the lever 187 and be restored out of the path of said lever by the spring 185, so as not to interfere with rearward movement of the pitman 181 when the shaft 139 is shifted clockwise to red printing position.

*Black key mechanism*

Figure 18:
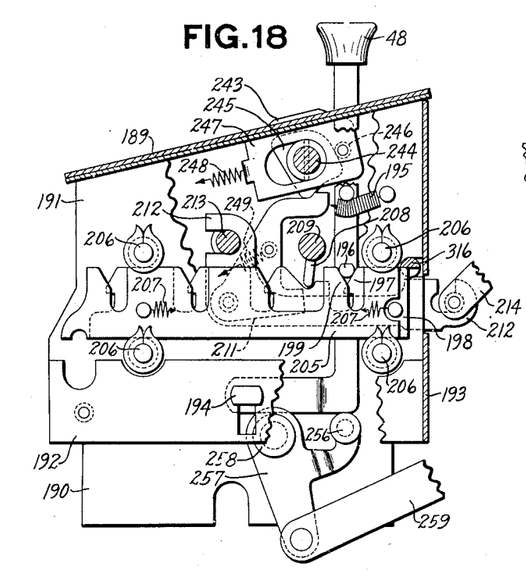
Fig. 18 is a side elevation of the black key and a part of its associated mechanism.
Figure 19:
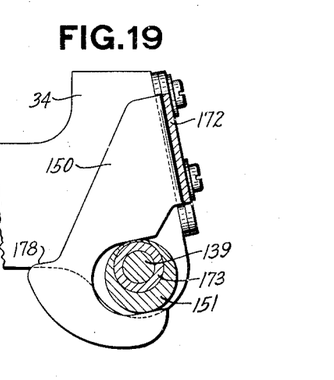
Fig. 19 is a section taken along the line 19—19 in Fig. 16.
Figure 20:
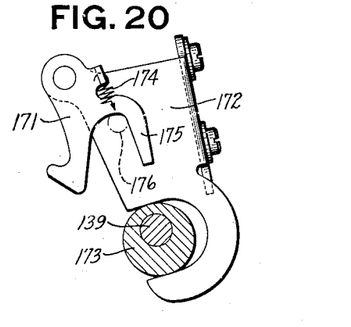
Fig. 20 is a detail view of a portion of the ribbon shifting mechanism.
Figure 21:
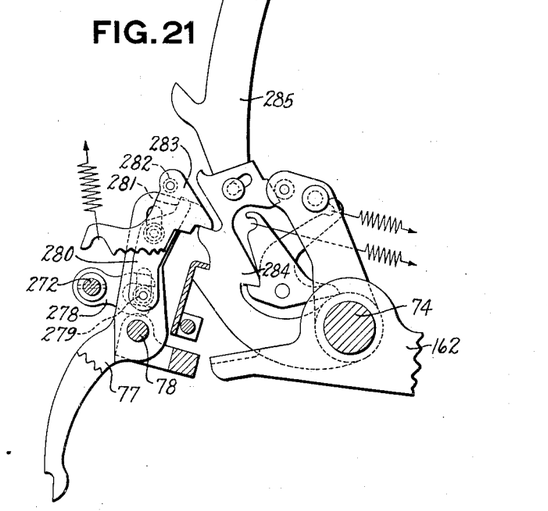
Fig. 21 is a detail showing of the latches controlling the operation of the symbol printing sector.

The manner in which the black key 48 (Fig. 1) renders the mechanism shown in Fig. 2 ineffective to shift the color shaft 139 to red printing position in subtract operations will now be described. The auxiliary key frame supporting the black key 48 (Figs. 10, 13 and 18) comprises an angular top plate 189, two end plates 190, only one here shown, a series of partition plates 191, and a plurality of key guide plates 192. The end plates 190 are connected by a back plate 193, and a front plate 200, and the auxiliary keyboard assembly is rigidly secured to the base 32 (Fig. 6), by means of the end plates 190 in cooperation with upward extensions of said base 32. The upper end of the black key 48 extends through an opening in the keyboard plate 189 while a forward extension on the lower end thereof carries a stud 194, which protrudes through a vertical slot in one of the plates 192. A stud in the stem of the key 48, in cooperation with a coil spring 195 urges said key upwardly and normally maintains it in undepressed position, as here shown. The key 48 carries a stud 196 which cooperates with one of a series of hook-shaped projections 197 on a detent 198, and with the angular surface of one of a series of camming extensions 199 on a control plate 205.

The detent 198 and the plate 205 are mounted adjacent each other for independent horizontal sliding movement between four rollers mounted on studs 206 secured in the plate 191. A spring 207 tensioned between the detent 198 and the plate 205 urges said detent and said plate forwardly and rearwardly, respectively, to cause the hook 197 to latch over a flat-topped surface of the stud 196 when the black key 48 is depressed, to retain said key depressed.

*Black key release mechanism*

Mechanism is provided to automatically release the black key 48 at the end of non-adding, adding, and subtracting operations and at the beginning of total-taking operations. Means are also provided for manually releasing the black key by using the regular release key 47, and a manually operated knob is provided for rendering both the automatic and the manual releasing means inoperative.

The detent 198 has a notch in the upper surface thereof (Figs. 6, 10, 12, and 18) which cooperates with the end of a lug 208 on a shaft 209, journaled in two of the plates 191. The shaft 209 also has a depending lug 210, similar to the lug 208, which cooperates with a coupling plate 211, pivotally connected to a slide 212, an upward extension of which is slotted to loosely embrace a stud 213 in the plate 191. The righthand end of said slide (as here viewed) extends through an opening in the back plate 193.

The righthand end of the slide 212 is slotted to receive a stud in one end of a link 214, the other end of which is pivoted to an arm 215 secured on the key release shaft 89. The lower end of the arm 215 has a V-shaped notch which engages a stud 216 in an extension of a bar 217 mounted for horizontal sliding movement on studs 218 and 219 secured in the frame 31. The bar 217 (Fig. 17) has pivoted thereto a pawl 220 with a hook 221 adapted to cooperate with a roller 222 mounted on a disk 223 secured on the main shaft 38.

Also turnably mounted on a downward extension of the bar 217 is a pawl 224 with a notch 225 adapted to latch over a stud 226 in the lower end of a lever 227 fulcrumed on a stud 228 in the left frame 31. A node 229 on the lever 227 cooperates with a roller 230 secured on the disk 223, and said lever 227 is normally maintained in engagement with said roller by a spring 231. The pawl 224 is normally held out of engagement with the stud 226 by means of a tail 232 thereof in cooperation with a stud 233 in a release control link 234, the forward end of which is pivoted to the lower end of a lever 235 fulcrumed on a stud 236 in the frame 31. The lever 235 has a bent-over ear 237 adapted to engage a notch 238 in the sub-balance key 46, when said key is depressed, to control the releasing of said key in the usual manner. A spring 239 urges the link 234 counterclockwise or upwardly to normally maintain the rearward end of said link in contact with a shoulder on the stud 219. A torsion spring 240 anchored on a stud in the downward extension of the bar 217 urges the pawl 220 clockwise to maintain a flat surface on the nose of the hook 21 in contact with the roller 222 when the machine is at rest.

In adding and substracting operations, initial movement counterclockwise of the main shaft 38 and the disk 223 causes the roller 222 to move beyond the hook 221 whereupon the spring 240 urges the pawl 220 clockwise to move the hook in the path of said roller 222. Return movement clockwise of the shaft 38 and the disk 223 causes the roller 222 to engage the hook 221 and move the bar 217 rearwardly to rock the arm 215 and the key release shaft 89 counterclockwise. Counterclockwise movement of the shaft 89 (Fig. 6) and the arm 90 causes the stud 91 to release the depressed amount keys near the end of machine operation in the manner explained earlier herein. After the pawl 220 (Fig. 17) has shifted the bar 217 rearwardly sufficiently to release the depressed amount keys, an extending foot 241 of said pawl engages a stationary stud 242 to disengage the hook 221 from the roller 222. The bar 217, the arm 215 and shaft 89 are then spring-returned to normal position, as here shown.

Figure 2:
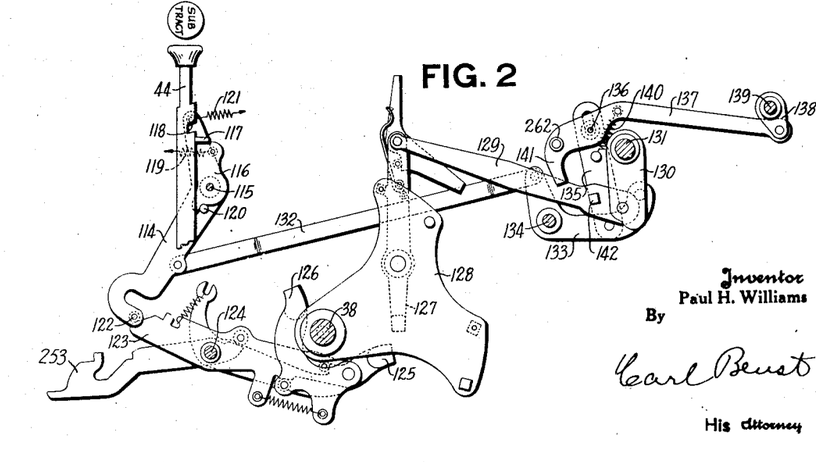
Fig. 2 is a side elevation of the subtract key and associated mechanism that normally lifts the inking ribbon to red printing position in debit or subtract operations.

In total-taking operations, the total control lever for the totalizer in which the total-taking operation is being performed, for instance, lever 253, shown in Fig. 2, engages stud 252 on the link 234 and rocks the link 234 (Fig. 17) clockwise or downwardly to permit the spring 240 to rock the pawl 224 counterclockwise to engage the notch 225 with the stud 226 prior to initial movement of the shaft 38. Initial movement of the shaft 38 and the disk 223 counterclockwise causes the roller 230 to engage the node 229 and rock the lever 227 counterclockwise to shift the bar 217 rearwardly to rock the arm 215 and the shaft 89 counterclockwise to release any depressed amount key before the actuators 55 (Fig. 6) start their initial movement rearwardly. After the pawl 224 has moved the bar 217 rearwardly sufficiently to release the depressed amount keys, in the first part of a total-taking operation, a roller 250 mounted on the disk 223 engages a node 251 on the pawl 224 and rocks and maintains said pawl out of engagement with the stud 226 until the link 234 is restored upwardly and the stud 233 again engages the tail 232 of said pawl 224.

When the arm 215 is rocked, the link 214 shifts the slide 212 (Figs. 10 and 12) first rearwardly and then back to normal position to release the black key 48 when a control knob 243 (see also Fig. 13) is in the proper position. The knob 243 is secured on a short shaft 244 journaled in the plate 190 and one of the plates 191, and said shaft has integral therewith a cam 245 adapted to cooperate with a rearward extension of the plate 211. The knob 243 has two positions, namely, stay-down and not-stay-down, as shown respectively in Figs. 10 and 6, and is retained in either of these positions by means of a stud 246 in a slide 247 slotted to embrace a collar on the shaft 244 and urged forwardly by a spring 248 to normally maintain the stud 246 in engagement with notches in the periphery of the cam 245 corresponding to the two positions of the knob 243. When the knob 243 is moved to stay-down position (Fig. 18), a lobe of the cam 245 rocks the plate 211 clockwise against the action of a spring 249 to move a projection 255 of said plate out of the path of the lug 210, so that movement of the slide 212 when the key release mechanism functions will impart no movement to the shaft 209 to retain the black key 48 depressed.

When the knob 243 is moved to not-stay-down position, a flat surface on the cam 245, in cooperation with a raised surface on the rearward extension of the plate 211, permits said plate to move counterclockwise under influence of the spring 249 to rock the projection 255 into the path of the lug 210. In this case it is, therefore, evident that as the slide 212 is shifted back and forth by the key release mechanism, in the manner explained above, the projection 255 of the plate 211 will engage the lug 210 to rock the shaft 209 counterclockwise. Counterclockwise movement of the shaft 209, by means of the lug 208, shifts the detent 198 rearwardly to disengage the hook 197 thereof from the stud 196 to permit the black key 48 to be spring-returned upwardly to normal position. Upon return movement of the slide 212, the spring 207 returns the detent 198 and the shaft 209 in unison therewith.

Depressing the black key 48 (Figs. 10 and 18) causes the lower end thereof, in cooperation with a roller 256 on an extension of an arm 257 pivoted on a stud 258 fast in the plate 190, to rock said arm 257 clockwise. Clockwise movement of the arm 257, by means of a link 259 connecting said arm to another arm 260, loose on the stud 134, rocks said arm 260 counterclockwise against the action of a spring 261 to move an arcuate upper surface of said arm into the path of a roll 262 on the link 137. The arm 260 in cooperation with the roll 262 retains the hook 141 of the link 137 out of the path of the stud 142 (Fig. 2) when the subtract key 44 is depressed or when the traveling carriage 36 is tabulated to one of the three divisions in the check column of the ledger sheet 95 (Fig. 3). It is therefore obvious that when the black key is depressed and the No. 1 or balance totalizer is selected for a subtract operation, subsequent engagement of said totalizer with the actuators, by the mechanism illustrated in Fig. 2, will impart no movement to the link 137 and the color shaft 139. Consequently the hook 171 (Fig. 8) will remain in the path of the stud 170, thereby causing the black portion of the bichrome ribbon 143 to be moved between the type sectors and the platen roll 37 to cause subtractive items to be printed in black.

The release key 47 (Figs. 1 and 10) in addition to providing a means for manually releasing depressed amount keys also releases the black key 48 when the knob 243 is in not-stay-down position. Depressing the release key 47 by means of a toggle link 263, one end of which is pivotally connected to said release key, the other end being bifurcated to embrace a stud 264 in the bar 217, shifts said bar 217 rearwardly to rock the arm 215 and the release shaft 89 counterclockwise to release the depressed amount keys and the black key 48 in the manner explained earlier herein.

*Black key control of symbol printing*

In the machine embodying the instant invention the neutral or zero position of the symbol printing sector is used to print a distinguishing symbol for the black key. When no symbol key is depressed the actuator and the printing segment for the symbol keys remain latched in neutral or zero position and consequently the symbol order hook latches the symbol printing sector against printing movement upon operation of the machine. It is therefore obvious that under ordinary conditions the zero position of the symbol is not used and could therefore be adapted for printing a symbol for the black key. When the #1 totalizer is selected and the machine is conditioned for a subtract operation by means of the control elements 97 on the traveling carriage 36 and the black key 48 is depressed, mechanism effective at the beginning of the machine operation and dependent upon the depression of one or more amount keys for effectiveness, rocks the order hook for the symbol printing sector out of engagement with the symbol printing arm. This permits said arm and the symbol sector to make a printing stroke, when said sector is in neutral or zero position, to print a symbol, in this case a minus sign, opposite the amount of the subtractive item. The black key symbol printing mechanism will now be described in detail.

Secured on the main shaft 38 (Fig. 10) is an arm 265 with a rearward projection which cooperates with a stud 266 in a link 267, the lower end of which is pivotally connected to a lever 268 loose on a stud 269 in the left frame 31. The upper end of the link 267 is bifurcated to receive a stud 270 in a crank 271 secured on a shaft 272, the lefthand end of which is journaled in an extension 273 of a bracket 274 (Fig. 5) secured to the cross frame 33 (Fig. 14). The righthand end of the shaft 272 is journaled in one of two end plates 275 that assist in supporting the printing mechanism. A spring 276 (Fig. 10), one end of which is connected to the link 267, urges said link, the crank 271, and the shaft 272 upwardly and counter clockwise respectively to normally maintain the stud 266 in resilient engagement with the projection of the arm 265. Another spring 277 connected between the link 267 and the stud 270 normally maintains the stud 270 in resilient engagement with the bottom of the slot in the upper end of said link 267. Opposite walls of a notch in the extension 273, in cooperation with the stud 270, limit the oscillating movement of the arm 271 and the shaft 272 when the shaft 38 and the arm 265 rock back and forth during machine operation.

Secured on the righthand end of the shaft 272 (Figs. 5, 8, 14 and 21) is an arm 278, bifurcated to straddle a stud 279 in a coupling plate 280 mounted to slide vertically upon the lowest order or one cent order hook 77 by means of studs in said slide in cooperation with two slots in said order hook 77. A projection 281 on the upper end of the plate 280 cooperates with a stud 282 in the upper end of a symbol order hook 283 mounted on the pivot 78 adjacent the one cent order hook 77, and has a hook shaped tooth which cooperates with a similar tooth on a plate 284 loose on the shaft 74. The plate 284 is connected to an arm 285 loose on the shaft 74. The arm 285 has pivotally connected to its upper end a symbol sector 286. The symbol sector 286 is connected by a link 287 to a segment not shown but similar to the amount segment 65 (Fig. 6) and has a corresponding actuator similar to the amount actuator 55. A projection 288 (Fig. 10) on the lever 268 cooperates with a bent-over ear 289 of the lever 109 and another projecting arm of said lever 268 carries a stud 290 which cooperates with the upper end of a lever 291 pivoted on a stud 292 in the frame 31. The lower end of the lever 291 is bifurcated to straddle a stud 293 in the link 259.

Depressing the black key 48 (Fig. 10) rocks the lever 257 clockwise and shifts the link 259 forwardly, which by means of the stud 293 rocks the lever 291 clockwise to move the upper end thereof out of the path of the stud 290 in the lever 268. Tabulating the traveling carriage to any one of the three divisions in the check column causes one of the control elements 97 (Fig. 5) to rock the hanging bar lever 106 clockwise, which in turn rocks the lever 109 counterclockwise as viewed in Fig. 10, to move the ear 289 upwardly out of the path of the projection 288 of the lever 268. Initial movement counterclockwise of the main shaft 38 and the plate 265 permits the spring 276 to lift the link 267 to rock the arm 271, the shaft 272, and the arm 278 (see also Fig. 8) counterclockwise. Counterclockwise movement of the arm 278 shifts the plate 280 upwardly to move the projection 281 thereof into the path of the stud 282 in the symbol order hook 283.

Overlying projections on the order hooks of the various denominations permit a higher denomination order hook to rock the lower order denomination hooks to ineffective position to permit the lower order zeros to print. It is therefore evident that when any amount key is depressed, counterclockwise movement of the units of cents order hook 77 (Fig. 8) by means of the projection 281 in cooperation with the stud 282 rocks the symbol order hook counterclockwise in unison therewith to free the plate 284, the arm 285, and the sector 286 for printing movement, so that the minus sign in the zero position of said sector 286 will print when the black key is depressed, and the other conditions outlined above will be fulfilled. Return movement clockwise of the shaft 38 and the plate 265 returns the link 267 and the shaft 272 downwardly to move the projection 281 on the plate 280 out of the path of the stud 282 in the symbol order hook 283.

*Means to lock the black key during machine operation*

Figures 14, 15, 16, 17:
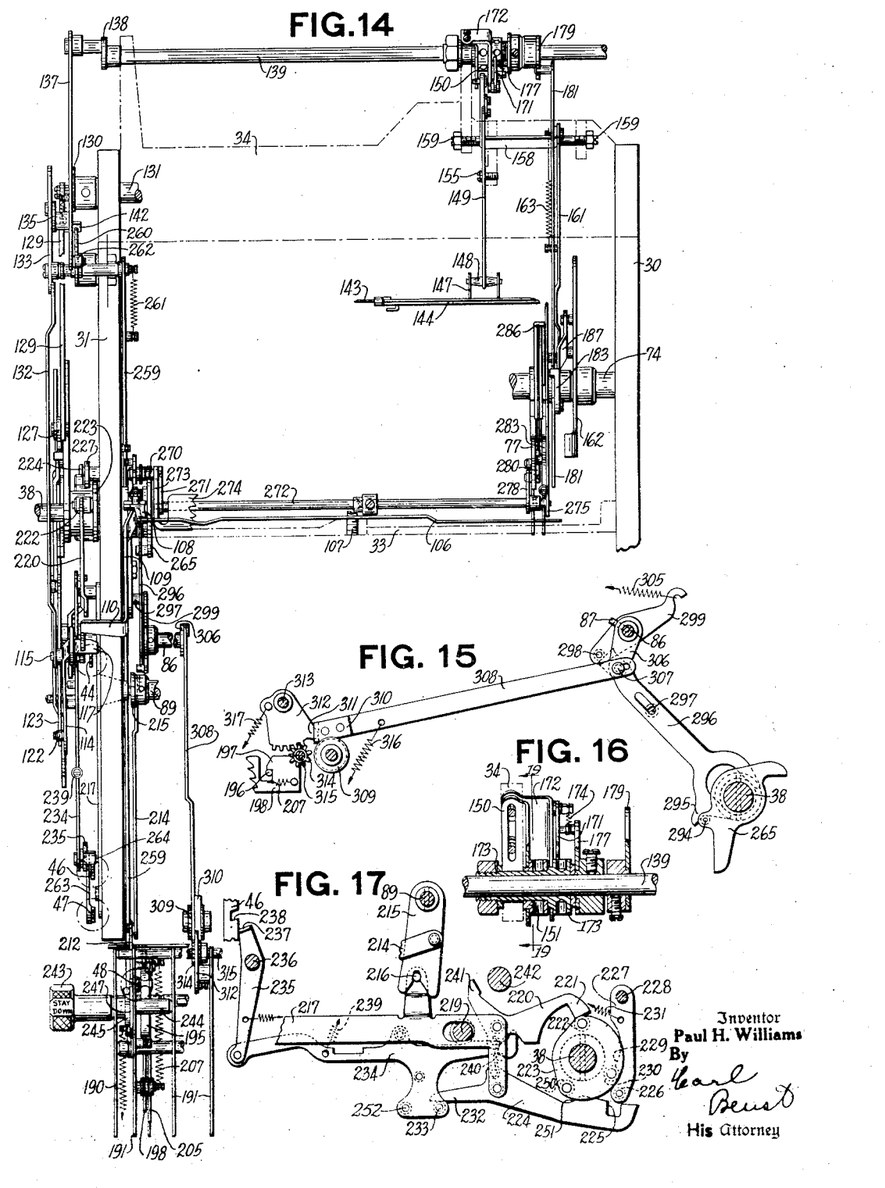
Fig. 14 is a top-plan view of the mechanism that controls the ribbon shifting and the symbol printing in subtract operations.
Fig. 15 is a side view of the mechanism that locks the black key against manipulation during machine operation.
Fig. 16 is a cross-sectional view of a part of the mechanism shown in Fig. 9, illustrating how said mechanism is assembled on the color shaft.
Fig. 17 is a detail view of the key releasing mechanism.

Mechanism illustrated in Figs. 14 and 15 locks the black key against movement during machine operation. This mechanism includes a stud 294 in the lever 265, which cooperates with a projection 295 of a pitman 296, slidably mounted by means of the bifurcated lower end thereof which loosely embraces the main drive shaft 38, and by means of a slot therein through which extends a stud 297 secured in the frame 31. The upper end of the pitman 296 coacts with a stud 298 in an arm 299 secured on the shaft 86 and urged counterclockwise by a spring 305 to normally maintain the stud 298 in contact with the upper end of said pitman 296. Secured on the shaft 86 is a crank 306 with a stud 307, which extends through a slot in one end of a link 308, the forward end of which rests in an annular groove in a roller 309 loose on a stud secured in one of the plates 51 of the main keyboard. Secured on the forward end of the link 308 is a block 310 having therein a vertical groove adapted to receive a rounded projection 311 of a gear segment 312 secured on a shaft 313 journaled in the end plate 190 and the separator plates 191 of the auxiliary keyboard. The sector 312 meshes with a pinion 314 secured on a shaft 315 journaled in the plates 191. A spring 316 urges the link 308 forwardly and downwardly to maintain the forward end of said link in the groove in the roller 309 and to maintain the bottom of the groove in the block 310 in contact with the projection 311. A spring 317, strong enough to overcome the action of the spring 316, urges the segment 312 and the shaft 313 counterclockwise to maintain the projection 311 in contact with the bottom of the groove in the block 310. The shaft 315 has therein a groove adapted to receive the upper edge of the detent 198 and when the machine is at rest the bottom of this groove is parallel to the top edge of said plate 198 and permits the plate to slide back and forth when the black key 48 (see also Fig. 10) is depressed, or when the release key 47 is depressed, as explained earlier herein.

Initial movement counterclockwise of the main shaft 38 and the lever 265 withdraws the stud 294 from the projection 295 and permits the spring 305 to rock the arm 299, the shaft 86, and the crank 306 counterclockwise. Counterclockwise movement of the crank 306 permits the spring 311 to urge the segment 312 and the link 308 counterclockwise and rearwardly, respectively, as viewed in Fig. 15. Counterclockwise movement of the segment 312 rotates the pinion 314 and the shaft 315 clockwise to move the bottom of the groove in said shaft at right angles to the top edge of the detent 198 and in the path of the end of said detent to obstruct rearward movement thereof to prevent the depression of the black key 48 during machine operation, and to prevent the release of said black key by means of the release key 47 while the machine is operating. Near the end of machine operation and prior to the shifting of the detent 198 by the mechanism shown in Fig. 9 to release the depressed black key 48 in the manner explained earlier herein, return movement clockwise of the shaft 38 and the lever 265 moves the pitman 296 upwardly to rock the shaft 86 and the crank 306 clockwise, which by means of the link 308 restores the segment 312, the pinion 314, and the shaft 315 clockwise and counterclockwise respectively to normal position, to permit sliding movement of the detent 198.

Initial movement counterclockwise of the shaft 86 under influence of the mechanism shown in Fig. 15 causes the locking bar 87 (see also Fig. 6) to move into the path of the projection 88 on the amount detent 52 to lock the depressed amount keys against release, and the undepressed amount keys against depression while the machine is cycling, in the manner explained earlier herein.

Summarizing briefly, depressing the black key 48 causes the mechanism that normally shifts the inking ribbon to red printing position, when the #1 or balance totalizer is selected and conditioned for a subtract operation, to be rendered ineffective, and as a result, the black portion of the ribbon is raised into printing position to print subtractive items in black. Moreover, depressing the black key 48 causes the symbol sector 286 (Fig. 8) to be released in its zero position to print an identifying symbol, in this case a minus sign, adjacent the amount. Beside the depressing of the black key 48, the printing of the black key symbol is subject to two other conditions, namely, the depression of an amount key and the tabulation of the traveling carriage to a position where one of the subtract control elements 97 (Fig. 5) will engage the subtract hanging bar 106.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a calculating machine of the class described, having a balance totalizer, actuators therefor, and printing means, the combination of a two-colored inking ribbon cooperating with the printing means to make imprints on record material; means to move the ribbon from a non-printing position to either of two printing positions; means to engage the totalizer with the actuators; means operated by the engaging means to control the ribbon moving means to cause the moving means to move the ribbon to one printing position to print items in a certain color; and means to render the means operated by the engaging means inoperative to control the ribbon moving means to cause the moving means to move the ribbon to another position to print items in another color.

2. In a calculating machine having a balance totalizer, actuators for said totalizer, and printing means, the combination of a two-color inking ribbon cooperating with the printing means to make imprints on record material; means to move the ribbon from a non-printing position to either of two printing positions; means to control the moving means to cause the ribbon to be moved to the desired printing position; means to engage the totalizer with the actuators; means to connect the engaging means to the controlling means, said connecting means being normally out of operative relationship with said engaging means; means to move the connecting means into operative relationship with the engaging means to cause the control means to be operated by the engaging means to cause items to be printed in one color; and means to restrain the connecting means from movement into operative relationship with the engaging means to prevent the control means from being operated by the engaging means, to cause items to be printed in another color.

3. In a calculating machine having a balance totalizer, actuators for said totalizer, and printing means, the combination of a two-color inking ribbon cooperating with the printing means to make imprints on record material; means to move the ribbon from a non-printing position to either of two printing positions; means to control the moving means to cause the ribbon to be moved to the desired printing position; means to engage the totalizer with the actuator; means to connect the engaging means to the controlling means, said connecting means being normally out of operative relationship with the engaging means; means yieldably connected to the connecting means and operable to move the connecting means into operative relationship with the engaging means, whereby the engaging means operates the control means to control the ribbon moving means to cause items to be printed in one color; and means including a depressible key and a blocking member operated by said key and cooperable with the connecting means to restrain the connecting means from movement by its moving means into operative relationship with the engaging means whereby the control means is not operated by the engaging means and controls the operation of the ribbon moving means to cause items to be printed in another color.

4. In a calculating machine having a balance totalizer, actuators for said totalizer, and printing means, the combination of a two-color inking ribbon cooperating with the printing means to make imprints on record material; means to move the ribbon from a non-printing position to either of two printing positions; means to control the moving means to cause the ribbon to be moved to the desired printing position; means to engage the totalizer with the actuators; a projection on the engaging means; a shiftable member connected to the controlling means and arranged to cooperate with the projection; means to move the member into operative alinement with the projection to cause the engaging means to shift the controlling means to cause items to be printed in a certain color; and means including a manipulative device and an element settable thereby and cooperable with the member to prevent the member from moving into operative alinement with the projection to prevent the shifting of the controlling means to cause items to be printed in another color.

5. In a calculating machine of the class described, the combination with a traveling carriage, a platen roll supported by said carriage, type carriers, a two-color inking ribbon cooperating with the type carriers and the platen roll to make imprints on record material carried by said platen roll, a balance totalizer, and actuators for said totalizer, of means to move the ribbon from a non-printing position to either of two printing positions; means to control the moving means to determine to which printing position the ribbon shall move; means to engage the totalizer with the actuators; a projection on the engaging means; a member connected to the controlling means and adapted to coact with the projection; mechanism including control elements on the traveling carriage and a manipulative member to control the engaging means to cause the balance totalizer to perform a subtract operation; means whereby the mechanism moves the member connected to the controlling means into coacting relationship with the projection, whereupon the engaging means moves the controlling means to control the ribbon moving means to cause the ribbon to be moved to one of its printing positions to print subtractive items in a certain color; and means comprising a depressible key and mechanism associated therewith to prevent the member connected to the control means from moving the control means to thereby control the ribbon moving means so that the ribbon assumes another position to print subtractive items in another color.

6. In a calculating machine of the class described, having a balance totalizer, printing means, and a two-color inking ribbon cooperating with the printing means to make imprints on record material, the combination of means to move the ribbon from a non-printing position to either of two printing positions; means including a shiftable element, to control the moving means; shifting means operable each time the balance totalizer is operated in adding or subtracting operations; mechanism to cause the balance totalizer to perform subtract operations; means, operated by said mechanism to connect the element to the shifting means, to shift the element to ineffective position, to thereby cause the moving means to move the ribbon to one position to print subtractive items in a certain color; and means to render the means operated by the mechanism inoperative, to thereby prevent the connection of the element and the shifting means so as to retain the element in effective position to cause the moving means to move the ribbon to its other position to print subtractive items in another color.

7. In a machine of the class described, having a balance totalizer and printing means including a two-color inking ribbon, a symbol type carrier normally in position to print an identifying symbol, amount keys, and an amount type carrier, the combination of mechanism to cause the balance totalizer to be operable in subtract operations; means to cause the ribbon to be shifted to a position where subtractive items will be printed in a certain color; separate means to retain each of the type carriers against printing movement; means controlled by amount keys and operable during an operation of the machine to move the amount type carrier retaining means to ineffective position; means to connect the two retaining means; and means controlled by the causing means and the mechanism to render the connecting means effective, whereupon operation of the means controlled by the amount keys, when an amount key has been depressed causes the amount type carrier retaining means to move the symbol type carrier retaining means to ineffective position to allow the symbol type carrier to function in its normal position to print said identifying symbol.

8. In a machine of the class described, having a balance totalizer, an amount type carrier, and a symbol type carrier, the combination of separate means, normally effective, to retain each of the type carriers against printing movement when said type carriers are in a normal position; means to connect the two retaining means; mechanism to enable the balance totalizer to perform subtract operations; means to cause subtractive items to be printed in a particular color; means tending to move the connecting means to effective position each machine operation; means whereby the mechanism and the causing means permit movement of the connecting means to effective position; and means including amount keys to move the amount type carrier retaining means and the symbol type carrier retaining means to ineffective position when the connecting means is effective to allow the symbol type carrier to record an identifying symbol.

9. In a calculating machine operable in adding and subtracting operations and having a balance totalizer, and means to cause said balance totalizer to perform subtract operations, the combination of amount keys; an amount type carrier; a symbol type carrier; separate means to retain each of the type carriers against printing movement; means controlled by the amount keys and operable in machine operations to move the amount type carrier retaining means to ineffective position; normally ineffective means to connect the two retaining means; a manipulative device; means, effective when the balance totalizer is caused to perform a subtract operation and when the manipulative device is operated, to move the connecting means to effective position, whereupon operation of the means controlled by the amount keys causes the amount type carrier retaining means to move the symbol type carrier retaining means to ineffective position to cause the symbol type carrier to function.

10. In a calculating machine operable in adding and subtracting operations and having a balance totalizer and a traveling carriage, the combination of means comprising an element operated by the traveling carriage, in predetermined columnar positions, to cause the balance totalizer to be operable to perform subtracting operations; amount keys; an amount type carrier; a symbol type carrier; separate means to restrain each of the type carriers against printing movement; means controlled by amount keys and operable during subtract operations to release the amount type carrier restraining means; means normally ineffective, but rendered effective, to connect the two restraining means so that release of the amount type carrier restraining means will also release the symbol type carrier restraining means; a manipulative device; a cyclically operable device; and means to move the connecting means to effective position including a member cooperable with the cyclically operable device to be released thereby for operation and controlled by the element and the manipulative device, to render the connecting means effective when the manipulative device is operated and the traveling carriage is tabulated to predetermined columnar positions to operate the element to cause the symbol type carrier to record an identifying character indicating that these conditions were present during the machine operation.

11. In a machine of the class described, having a balance totalizer and a traveling carriage, the combination of means comprising an element operated by the traveling carriage, in predetermined columnar positions, to select the balance totalizer for subtract operations; amount keys; an amount type carrier; a symbol type carrier; separate means to restrain each of the type carriers against printing movement; means, controlled by the amount keys, and operable during a subtract operation to release the amount type carrier restraining means; means normally ineffective, but shiftable to connect the two restraining means so that release of the amount type carrier restraining means will also release the symbol type carrier restraining means; means including a depressible color control key to cause subtractive items to be printed in a certain color; a lever operated by the color control key; and a member controlled by the element and the lever to shift the connecting means when the traveling carriage is tabulated to predetermined columnar positions and when the color control key is depressed to allow the symbol type carrier to print an identifying character.

12. In a calculating machine having a balance totalizer and a traveling carriage, the combination of means comprising an element operated by the traveling carriage, in predetermined columnar positions, to render the balance totalizer operable to perform subtract operations; a symbol type carrier; means to normally restrain the symbol type carrier against printing movement; means operable during a machine operation to release the restraining means; means to couple the releasing means to the restraining means; means including a color control key to cause subtractive items to be printed in a certain color; a lever operated by the color control key; and a member controlled by the element and the lever to render the coupling means effective when the traveling carriage is tabulated to predetermined columnar positions and when the color control key is depressed to cause the symbol type carrier to print an identifying character during a subtract operation.

13. In a machine of the class described, having a balance totalizer and printing means, including a symbol type carrier, the combination of a two-color inking ribbon; means to move the ribbon to either of two printing positions, said ribbon cooperating with the printing means to make imprints on record material; means to restrain the symbol type carrier against printing movement; means operable during an operation of the machine to move the restraining means to ineffective position; means to connect the moving means to the restraining means; mechanism to cause the balance totalizer to perform a particular operation; means operated by the mechanism to control the operation of the ribbon moving means to cause the ribbon to be moved to one printing position to print items in a certain color; and means, including a manipulative device, to render the means operated by the mechanism inoperative, to cause the ribbon moving means to move the ribbon to another printing position to print items in another color, said rendering means and said mechanism also adapted to render the connecting means effective to cause the symbol type carrier to function to print an identifying symbol for said particular operation.

14. In a machine of the class described adapted to perform adding and subtracting operations, the combination with type carriers, a platen, and a bichrome ribbon cooperating with the type carriers and platen to make imprints on record material, of means to move the ribbon to and from printing position; control means normally controlling the ribbon moving means to cause a certain portion of the ribbon to be moved to printing position, said control means being shiftable to another position to control the ribbon moving means to cause another portion of the ribbon to be moved to printing position; means to shift the control means; operating means for the shifting means; subtraction control means to condition certain elements of the machine for a subtracting operation; means operated by the subtraction control means to move the shifting means into cooperation with its operating means for operation thereby during a subtracting operation whereby the control means will be shifted and said other portion of the ribbon will be moved to printing position; and manipulative means cooperable with the shifting means to block the movement of the shifting means into cooperation with its operating means so that the control means will not be shifted and the ribbon will be shifted to said certain portion, even though certain elements of the machine are conditioned for a subtracting operation.

15. In a computing machine having a totalizer adapted to perform adding and subtracting operations, the combination of printing means; a multi-colored ribbon cooperating with the printing means to make records on record material; means to move the ribbon from a normal position to either of two printing positions; control means for said ribbon moving means normally operable to cause the ribbon to be moved to one of said printing positions and shiftable to control the ribbon moving means to cause the ribbon to be moved to another of said printing positions; means operating each time the balance totalizer is operated in adding or subtracting operations for shifting the control means; subtraction control means for setting certain elements of the machine to cause a subtracting operation; means operated by the subtraction control means for connecting the shifting means to the control means to shift the control means in a subtracting operation whereby said ribbon is shifted to said other printing position in subtracting operations; and manipulative means operable to block the connecting of the shifting means with the control means in a subtracting operation to prevent the shifting of the control means so that the ribbon will be shifted to said one printing position even though the machine is set to perform a subtracting operation.

16. In a calculating machine having an add-subtract totalizer and actuators therefor, the combination of printing means including type carriers and a platen roll; a two-color inking ribbon cooperating with the printing means to make imprints on record material; means to move the ribbon from a non-printing position to either of two printing positions; means to control the moving means to cause the ribbon to be moved to the desired printing position; means to engage the totalizer with the actuators; mechanism to control the engaging means to cause the totalizer to perform subtraction; a projection on the engaging means; a member connected to the controlling means and arranged to cooperate with the projection; means operated by said mechanism and yieldably connected to the member to move the member into operative alinement with the projection whereby the engaging means can condition the control means to cause subtractive items to be printed in a certain color; and means including a depressible key and parts operated thereby to retain the member out of operative alinement with the projection when the mechanism is operated, whereby the control means will cause the printing of subtractive items to be in another color.

17. In a calculating machine of the class described, the combination with a traveling carriage, a platen roll supported by the carriage, type carriers, a two-color inking ribbon cooperating with the type carriers and the platen roll to make imprints on record material carried by said platen roll, and a balance totalizer, of means to move the ribbon from a non-printing position to either of two printing positions; control means for said moving means, normally effective to cause the moving means to move the ribbon to one of said printing positions to print in one color and shiftable to cause the moving means to move the ribbon to the other of said printing positions to print in another color; mechanism including control elements on the traveling carriage and a manipulative member to render the balance totalizer operable to perform subtracting operations; means moved each time the balance totalizer is operated in adding and subtracting operations; means actuated by said mechanism to connect the control means to the moved means to shift the control means so that printing will take place in said other color in subtract operations; and means comprising a control key and associated parts for rendering the mechanism ineffective to actuate the connecting means so that said control means will remain in normal position and printing will take place in said one color even though the mechanism is operated.

18. In a machine of the class described having amount entering means, a balance totalizer operable to perform addition and subtraction, amount printing means, symbol printing means, a two-color ribbon, and means to move the ribbon to cause printing to take place in one or the other color, the combination of means to cause the totalizer to perform a subtract operation; control means for said moving means controlled by the causing means to enable subtractive amounts to be printed in one color; a manipulative device; means operated by said device for disabling the control of the control means by the causing means so that subtractive items will be printed in another color; and means jointly controlled by the manipulative device and the causing means to render the symbol printing means operative to print a symbol to indicate that the subtractive item has been printed in said other color.

19. In a machine of the class described, having a totalizer and printing means including amount type carriers, a symbol type carrier normally in position to print an identifying symbol but normally inoperative to print while in said position, and a two-color ribbon cooperable with said type carriers to enable impressions to be made in either color, the combination of mechanism to select the totalizer for a particular operation; manipulative means to cause printing to be in a certain color in said particular operation; and means jointly controlled by said mechanism and manipulative means to render said symbol type carrier operable in its normal position to print a symbol indicating that the totalizer has been selected for said particular operation and that amounts have been printed in said certain color.

20. In a machine of the class described having a traveling carriage, a totalizer, a plurality of amount keys for controlling the entry of amounts in said totalizer, and symbol printing means normally in position to print a symbol, the combination of a latch normally preventing the operation of said symbol printing means to print said symbol; means rendered operable by said amount keys and normally uncoupled from said latch; a manipulative device; and means including a member controlled by the traveling carriage in certain positions thereof and by the manipulative device to couple the means rendered operable by the amount keys to the latch, to remove the latch when the means rendered operable by the keys is operated, so that the symbol printing means can operate to print said symbol.

21. In a calculating machine having a balance totalizer, an amount type carrier, and a symbol type carrier, the combination of separate means, normally effective, to retain each of the type carriers against printing movement, when said type carriers are in a normal position; means to connect the two retaining means; mechanism to enable the balance totalizer to be operated to perform subtract operations; means to cause subtractive items to be printed in a particular color; a blocking element movable by the causing means; means tending to move the connecting means to effective position each machine operation; a member adapted to obstruct movement of the connecting means by the moving means when the mechanism is in ineffective position and the element is in blocking position, whereupon movement of said mechanism to effective position and the movement of the element out of blocking position by the causing means permits the moving means to move the connecting means also to effective position during the machine operation; and means including amount keys to move the amount type carrier retaining means and the symbol type carrier retaining means to ineffective positions, when the connecting means is effective, to cause the symbol type carrier to record an identifying symbol.

22. In a machine of the class described having a traveling carriage, a totalizer, a plurality of amount keys for controlling the entry of amounts in said totalizer, and symbol printing means normally in position to print a symbol, the combination of a latch normally preventing the operation of said symbol printing means to print said symbol; means rendered operable by said amount keys and, when operated, normally ineffective to remove said latch; a manipulative device; and means including a member jointly controlled by the traveling carriage in certain positions thereof and by the manipulative device to enable the means rendered operable by the amount keys to be effective, when operated, to remove the latch so that the symbol printing means can operate to print said symbol.

PAUL H. WILLIAMS.